United States Patent [19]

Wintering et al.

[11] Patent Number: 4,657,566
[45] Date of Patent: Apr. 14, 1987

[54] EFFLUENT CLEANSING METHOD AND DEVICE

[76] Inventors: Joseph G. Wintering, 683 Clover Rd., Wauconda, Ill. 60084; William C. Werle, 342 N. Arsenal St., Indianapolis, Ind. 46201

[21] Appl. No.: 796,996

[22] Filed: Nov. 12, 1985

[51] Int. Cl.$^4$ ............................................. B01D 47/02
[52] U.S. Cl. ........................................ 55/73; 55/95; 55/224; 55/256
[58] Field of Search ............... 55/73, 90, 95, 233, 55/256, 257 NP, 257 PP, 228; 261/DIG. 9, 17, 64 R, 122

[56] References Cited

U.S. PATENT DOCUMENTS

| | | | |
|---|---|---|---|
| 2,332,063 | 10/1943 | Davis | 55/256 X |
| 2,405,494 | 8/1946 | Dupuy | 55/256 X |
| 2,947,383 | 8/1960 | Schytil et al. | 55/73 |
| 3,642,259 | 2/1972 | Bowden | 261/122 |
| 3,729,901 | 5/1973 | Jackson | 55/256 X |
| 3,782,080 | 1/1974 | Gallagher | 55/257 NP X |
| 3,853,502 | 12/1974 | Dorr et al. | 55/73 X |
| 4,528,005 | 7/1985 | Baxter | 55/256 X |

FOREIGN PATENT DOCUMENTS 0167020  12/1980  Japan ..................................... 55/256

OTHER PUBLICATIONS

Joy Manufacturing Company, "Flue Gas Desulfurization", 6-72.

Primary Examiner—Charles Hart
Attorney, Agent, or Firm—Beverly A. Vandenburgh

[57] ABSTRACT

A method and apparatus for removing pollutants from a gas by passing the gas through a liquid bath in a reservoir. A non-liquid space is provided above the liquid bath. The non-liquid space includes a cone-shaped baffle for trapping contaminated vapor escaping from the liquid bath and returning the vapor to the liquid bath sensing means is also provided in the non-liquid space for sensing the pollutants escaping from the cone-shaped baffle. Filler means is provided in the liquid bath for dissipating bubbles that may form in the liquid bath.

4 Claims, 1 Drawing Figure

EFFLUENT CLEANSING METHOD AND DEVICE

TECHNICAL FIELD

The present invention relates to a chimney fume scrubber and, more particularly, to a fume scrubber which substantially eliminates acid rain.

BACKGROUND OF THE INVENTION

One of the most serious environmental problems of our time is the pollution of the atmosphere by the effluent of furnaces. The smoke pouring from chimneys often contains high concentrations of irritants and pollutants, primarily sulfur dioxide. Sulfur dioxide is a colorless gas irritating to the throat and eyes of human beings and damaging to plant life through the formation in the atmosphere of acid rain. Because it is dangerous to the respiratory system even in low concentrations, sulfur dioxide is an objectionable constituent in the atmosphere. In its gaseous form sulfur dioxide finds its way into the atmosphere primarily through the combustion of all types of fuels and the smelting of sulfide ores.

The prior art generally makes use of spraying means to scrub out pollutants from effluents. Streams of water are introduced into the chimney, dissolving certain of the contaminants which then are directed away from the outlet of the chimney or flue. This means of scrubbing is only partially successful, and in large industrial situations quickly saturates the system and the contaminant escapes into the atmosphere. It is virtually impossible to flood this type of scrubbing equipment sufficiently to eliminate sulfur dioxide fumes. Fume scrubbers containing a liquid component and fabricated of reinforced plastic are also available for handling corrosive fumes. The scrubbers are unable to withstand the high temperatures of fuel combustion and sulfur ore smelting which often reach or exceed 1500 degrees Fahrenheit.

As will be apparent from the following description, the present invention overcomes the disadvantages of the prior art while providing a means for effectively cleaning flue effluent that is adaptable to virtually any size or temperature operation.

SUMMARY OF THE INVENTION

In the present invention the effluent from the outlet flue of a combustion zone, such as the traditional furnace chimney, is channeled into a liquid portion of a reservoir or tank in such a manner that escape of the pollutants into the atmosphere is virtually impossible. The pollutants, especially sulfur dioxide gas will bubble through the liquid as it attempts to rise to the top of the liquid and pass into the nonliquid portion of the reservoir and ultimately pass with the heat and other gases into the atmosphere. By positioning filtering devices in the liquid portion of the tank, or reservoir, above the inlet for the effluent into the liquid portion, we have been able to effectively break up the gas bubbles and trap the pollutants in the liquid primarily in the form of sulfurous acid until such time as the tank is cleaned and the liquid replaced with nonsulfurous acid containing liquid. If any pollutants escape the liquid in the reservoir, our invention has a secondary means for forcing them back into the liquid for ultimate entrapment therein. This secondary means is a generally cone-shaped baffle arrangement positioned above the liquid in the reservoir. Small openings at the sides of the baffle allow the excess heat in the form of steam to escape, lest there be too much pressure build-up. Above the baffle we have preferably positioned a heat resistant sensing device for sulfur dioxide.

The sensing device will send an alarm to the workman assigned to this post that sulfur dioxide is reaching the top of the reservoir, indicating that the liquid in the reservoir is saturated with all the sulfurous acid it can contain, and the reservoir can then be cleaned.

The cleaning of the tank, or reservoir, can be done after either stopping the flow of effluent into the tank, or, more efficiently, the effluent can be directed into another similarly designed reservoir or a second, separate, division of the reservoir. Thus, with our invention, it is possible to continually be cleaning the effluent from chimney flues, if desired, rather than having to shut down the process during revitalization of the system. An innovative part of our invention is the use of both chemical and mechanical means of directing the contaminants such that they are removed from the gases and steam ultimately dispersed in the atmosphere.

The contained nature of our invention provides for a cleaner and healthier environment for the workers in the factory or plant in which this device is installed, as well as providing a substantially pollution-free atmosphere for those in the vicinity of the plant. The reduction or elimination of sulfur dioxide in the atmosphere will reduce the potential for acid rain.

Prior art attempts to prevent sulfur dioxide contamination into the atmosphere have been only marginally successful. Such devices generally do not possess the ability to do more than reduce the amount of sulfur dioxide passing into the atmosphere and cannot be adapted for use on virtually any chimney. Often the heat resistance required is substantially greater than the prior art methods and devices can tolerate.

Further objects and advantages of our invention will be apparent from the following description thereof, taken in conjunction with the drawing.

DESCRIPTION OF THE PREFERRED EMBODIMENTS

Figure 1:
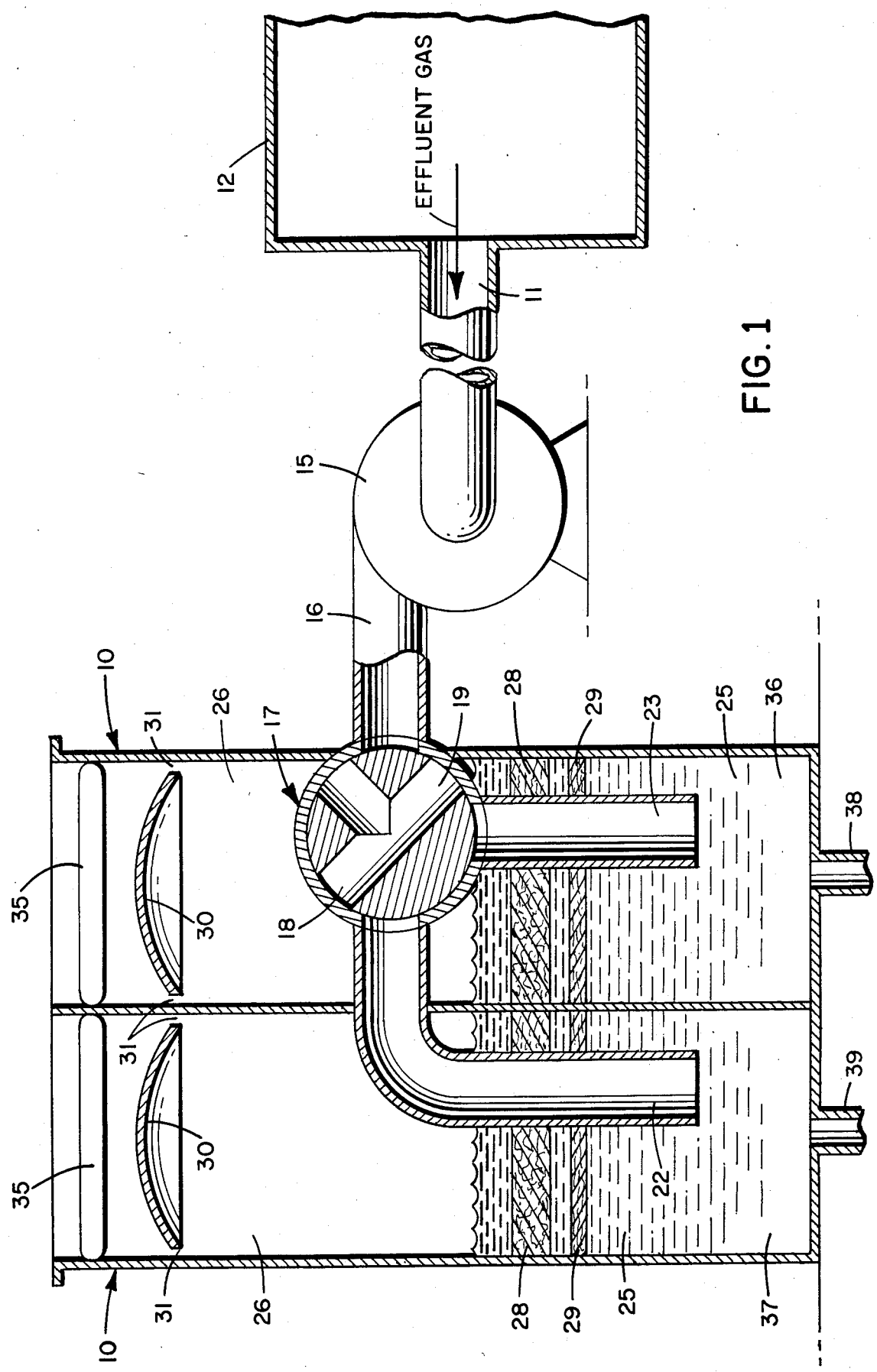
FIG. 1 is a sectional view of an enclosure showing one embodiment of the cleansing method and apparatus of the invention.

Referring now to the drawing, FIG. 1 illustrates a tank, or reservoir device, generally 10. The reservoir device has an inlet flue 11 connected by any suitable means to the outlet flue of a furnace, generally 12. The length and size of flue 11 will depend upon the heat intensity in the furnace and the volume of the effluent from the furnace. Flue 11 leads into a centrifugal air pump generally 15 which forces the effluent into a duct 16 leading to distribution valve generally 17 having outlets 18 and 19 to control distribution of the effluent into the appropriate entrance pipe 22 or 23 respectively. Pump 15 has a variable speed motor (not shown) to pull the effluent from the flue 11 and force it along duct 16, through the distribution valve, generally 17 and ultimately through either entrance pipe 22 or 23 into reservoir 10. Flue 11, duct 16 and entrance pipes 22 and 23 are of a material that will not emit sodium or chlorine when in contact with the effluent. Our preferred construction material is stainless steel.

Reservoir generally 10 is comprised of a liquid portion 25 and a nonliquid portion 26. Within the liquid portion 25 are filters 28 and 29 spaced vertically from one another and positioned above the outlet of pipe 22 and below the surface of the liquid at least about three inches. The distance from the surface of the liquid can vary with the volume of effluent, it being important that the force of the effluent upwardly on the filters 28 and 29 not push them into the nonliquid portion 26. Filters 28 and 29 are of a material similar in density to fiberglass and should be of a chemically inert material.

Positioned in the nonliquid portion of the reservoir is a generally cone-shaped baffle generally 30. Baffle 30 is preferably of metal and has apertures 31 to allow excess heat to escape and avoid pressure build-up.

Also positioned in the nonliquid portion of reservoir 10, upwardly of baffle 30, is a sensing device generally 35. Any sensor capable of detecting the presence of sulfur dioxide and transmitting that knowledge through means such as an alarm, buzzer, etc., is appropriate.

In operation, effluent enters the system through flue 11 and passes through pump 15 whereby it is forced through duct 16 and valve 17 into entrance pipe 22 where it is distributed into the liquid portion of the first division 36 of reservoir 10. The liquid in the reservoir is water, preferably distilled, or at least free of sodium or chlorine since those chemicals tend to liberate sulfur dioxide from the sulfurous acid which our invention is desirous of forming in the liquid portion of the reservoir.

The contaminants that have now been dispersed in the water are often in the form of bubbles, and they rise toward the top of the liquid portion in an effort to escape into the nonliquid portion and thence to the atmosphere. As they rise, these bubbles come into contact, sequentially, with filters 28 and 29, by which they are broken up and any solid contaminants are contained in the filters or fall below the filters and the sulfur dioxide gas is more readily dissolved in the water. As an anhydride of sulfurous acid, sulfur dioxide forms the acid when dissolved in water and it is this reaction that our invention wishes to accomplish. The reaction is easily reversible and thus necessitates the use of relatively pure water and substantial freedom from sodium and chlorine ions which tends to liberate the sulfur dioxide gas.

Once the gases have passed through the filters 28 and 29 and reach the nonliquid portion of the first division 36 of reservoir 10 they come in contact with baffle 30. As the vapor meets the cone-shaped baffle, it condenses on the metal and falls back into the liquid portion of the reservoir, allowing for further reduction of contaminants by trapping any further sulfur dioxide in the water.

We have found that a substantial portion of the sulfur dioxide is removed from the gases and trapped in the water prior to the gases reaching baffle 30, but this provision for causing condensation and return to the water further clarifies the gases prior to their entry into the atmosphere.

As shown in the drawing, apertures 31 are annularly positioned around baffle 30 to allow the escape of steam and to avoid pressure build-up in the system. The gases that pass through these apertures are substantially free from sulfur dioxide until sufficient sulfur dioxide effluent has been passed through the system to saturate the water therewith. When this saturation occurs, sulfur dioxide may pass through the apertures and sensor 35 will detect the situation and communicate it to a workman.

In our preferred embodiment, once the sensing device triggers an alarm of some variety, distribution valve 17 is turned to direct the flow of smoke from duct 16 into entrance pipe 23 and into the liquid portion of second division 37 of reservoir 10.

The first division 36 of the reservoir 10 can then be drained through drain pipe 38 and filters 28 and 29 cleaned or changed. The drain is then plugged, clean water added and first division 36 is ready for operation at such time as second division 37 needs cleaning. Drain pipe 39 is provided for cleaning of second division 37.

For efficiency purposes we prefer to have a multidivisional reservoir but it is also possible to shut down the system after it is necessary to clean the liquid and filters and reactivate it after cleaning.

The foregoing explanation of our preferred embodiments of the invention is for disclosure purposes only and changes may be made, particularly in matters of size, shape, and arrangement of parts, within the scope of the invention as determined by the broad, general meaning of the terms in which the appended claims are expressed.

We claim:

1. An apparatus for cleansing the effluent from a combustible gas zone of a chimney so as to substantially reduce the amount of pollutant gas passing into the atmosphere from said effluent, said apparatus comprising:
   a substantially inert-compositioned inlet flue positioned in said combustible gas zone;
   a centrifugal air pump disposed in said flue, said air pump adapted to move effluent from said zone into the liquid portion of a reservoir having a liquid portion and a non-liquid portion;
   a plurality of vertically spaced filters disposed within said liquid portion, said filters adapted to trap contaminants and dissipate bubbles that may form in said liquid portion when effuent is moved therein;
   a cone-shaped baffle disposed in said non-liquid portion, said baffle trapping contaminated vapor escaping from said liquid portion, condensing the vapor, and returning the condensed vapor to the liquid portion for further cleansing; and
   a sensor disposed upwardly of said baffle, said sensor detecting pollutant gas escaping through said baffle.

2. An apparatus for cleansing the effluent from a combustible gas zone of a chimney so as to substantially reduce the amount of sulfur dioxide passing into the atmosphere from said effluent, said apparatus comprising:
   a sodium and chlorine resistant inlet flue positioned in said combustible gas zone having a centrifugal air pump disposed therein, said air pump adapted to move effluent from said zone through a multi-positionable distribution valve into the liquid portion of the desired division of a reservoir having more than one division, each division having a liquid portion and a nonliquid portion;
   a plurality of vertically spaced screening filters disposed within the said liquid portion of each said division adapted to dissipate bubbles that may form in said liquid portion when sulfur dioxide containing effluent is moved therein; and
   a cone-shaped baffle and a sensor disposed within said nonliquid portion of each said division, said baffle positioned to direct the effluent passing from the said liquid portion of each said division toward the said sensor in said division and said sensor capable of detecting sulfur dioxide.

3. A method of separating pollutants from the effluent of a combustion zone prior to the effluent being discharged into the atmosphere, said method comprising the steps of:

directing pollutant-containing effluent from said combustion zone into the liquid portion of a reservoir having a liquid portion and a nonliquid portion into which the effluent is directed after leaving said liquid portion, said nonliquid portion adapted to detect the presence of said pollutant and to return said pollutant to said liquid portion of the reservoir prior to its escape into the atmosphere;

thereafter directing said pollutant-containing effluent through a filtering means in said liquid portion of said reservoir to reduce the size of any gas bubbles forming therein and to maintain said pollutant in the liquid until it combines therewith sufficiently to remain trapped therein while allowing the effluent to pass from the liquid portion of the reservoir to said nonliquid portion thereof and thence to the atmosphere; and periodically cleaning the liquid portion of the reservoir to remove the pollutants collected therein.

4. A method set forth in claim 3 wherein the liquid in the liquid portion is water.

* * * * *